United States Patent [19]
Li et al.

[11] Patent Number: 5,751,541
[45] Date of Patent: May 12, 1998

[54] POLYMER ELECTRODES FOR ENERGY STORAGE DEVICES AND METHOD OF MAKING SAME

[75] Inventors: Changming Li, Vernon Hills; Richard Hanson Jung, Park Ridge, both of Ill.

[73] Assignee: Motorola, Inc., Schaumburg, Ill.

[21] Appl. No.: 498,450

[22] Filed: Jul. 5, 1995

[51] Int. Cl.$^6$ ................ H01G 9/02; H01G 9/00
[52] U.S. Cl. .............. 361/525; 361/502; 361/523; 361/524; 361/526; 29/25.03
[58] Field of Search .............. 361/502, 523–529, 361/532, 541; 29/25.03; 429/30, 33, 40–46, 126, 128–129, 188, 190–193, 208; 252/62.2

[56] References Cited

U.S. PATENT DOCUMENTS

| | | | |
|---|---|---|---|
| 4,748,542 | 5/1988 | Lundsgaard | 361/433 |
| 5,581,438 | 12/1996 | Halliop | 361/502 |
| 5,621,607 | 4/1997 | Farahmandi et al. | 361/502 |

*Primary Examiner*—Bot L. Ledynh
*Attorney, Agent, or Firm*—Scott M. Garrett; Kelly A. Gardner; Felipe J. Farley

[57] ABSTRACT

A method for making high power electrochemical capacitors provides for depositing an electrically conducting polymer (20) (22) onto a non-noble metal substrate (10) which has been prepared by coating with an adhesion enhancing material (16) (18). Using the method, high power, high energy devices may be fabricated by arranging a plurality of individual capacitor cells into a stacked, bipolar device.

23 Claims, 7 Drawing Sheets

POLYMER ELECTRODES FOR ENERGY STORAGE DEVICES AND METHOD OF MAKING SAME

TECHNICAL FIELD

This invention relates in general to electrochemical charge storage devices, and particularly to high energy density, high power density polymer electrodes for such devices.

BACKGROUND OF THE INVENTION

As electronics devices and other electrical apparatuses increasingly become portable, advances must be made in energy storage devices to enable such portability. Indeed it is often the case with current electronics technology that the limiting factor to portability of a given device is the size and weight of the associated energy storage device. Obviously a small energy storage device may be fabricated for a given electrical device, but at the cost of energy capacity. The result is that either the energy source is too bulky, too heavy, or it does not last long enough. The main energy storage device used for portable electronics is the electrochemical battery cell, and increasingly the electrochemical capacitor.

Electrochemical capacitors are a class of devices characterized by relatively high power densities as compared with conventional battery systems. The charge mechanism of such capacitors is typically the result of primary, secondary, tertiary, and higher order oxidation/reduction reactions between the electrodes and the electrolyte of the device.

Heretofore, such devices have typically been made with electrodes fabricated of relatively exotic or expensive materials, such as ruthenium. More recently, conductive polymers such as polyaniline have been enplaned as the electrode of such devices. Conductive polymers have the advantage of being relatively inexpensive, as well as easy to fabricate. However, such devices have heretofore been successfully fabricated on noble metal substrates, such as platinum, or gold. The electrochemical deposition of polyaniline could not successfully be made on non-noble metal substrates because the resulting films yielded poor adhesion, and high resistance.

Accordingly, there is a need for electrochemical capacitor devices which are fabricated on inexpensive substrates, and which demonstrate acceptable device performance. To accomplish this, there is a need for a new processing technique which allows for the electrochemical deposition of such polymers in a relatively economical manner, while overcoming the problems associated with the prior art, namely poor adhesion and high resistance.

DETAILED DESCRIPTION OF THE PREFERRED EMBODIMENT

Figure 1:
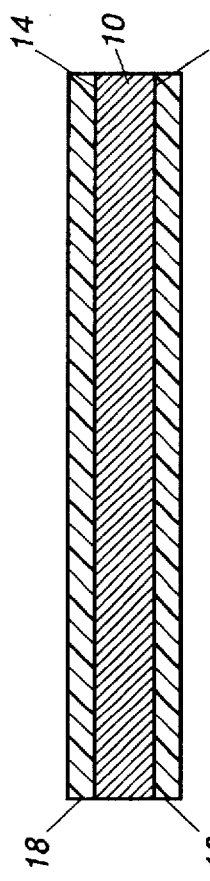
FIGS. 1 through 3 illustrate steps in the fabrication of an electrochemical charge storage device, in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Figure 2:
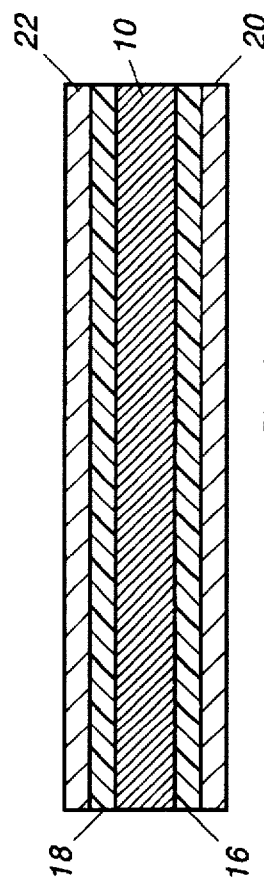
Figure 3:
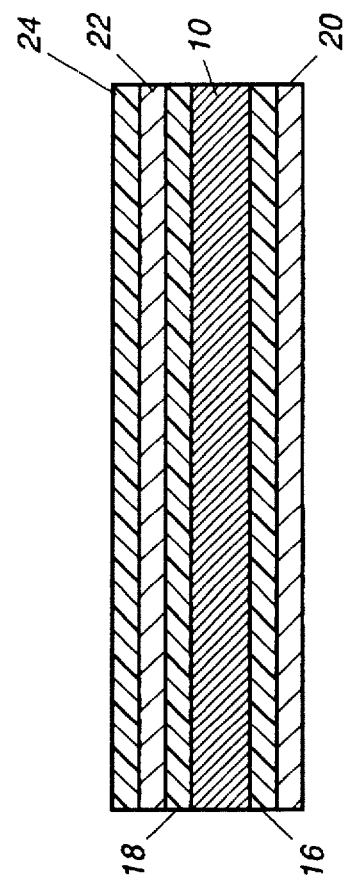

Referring now to FIGS. 1–3 there is illustrated therein the steps necessary to fabricate an electrochemical capacitor device in accordance with the instant invention. In FIG. 1 is illustrated the step of providing a current collecting substrate 10 for the electrochemical capacitor device. The substrate 10 includes at least first and second major surfaces 12 and 14, and may be, for example, a foil, a mesh, or a metallized cloth. The substrate is preferably formed of a non-noble metal, and hence may be fabricated from any of a number of materials, such as zinc, titanium, stainless steel, copper, nickel, iron, lead, tin, indium, tungsten, aluminum, bismuth, molybdenum, niobium, magnesium, manganese, alloys of the same, and combinations thereof. The substrate is typically between 10 μm and 500 μm thick, and preferably about 25 μm and 75 μm thick. When the substrate is a mesh, the openings in the mesh are typically between 10 and 100 cm$^2$, with a preferred aperture being about 60 cm$^2$.

Deposited on at least one of said major surfaces, and preferably both surfaces is a layer of an adhesion enhancing material 16 and 18. The adhesion enhancing material is a high surface area material adapted to provide a secure base upon which a layer of electrode material may be deposited, as described hereinbelow. The material surface area is on the order of between 60 and 2000 m$^2$/g. This base should provide high adhesion to both the substrate and the electrode layer, and offer low resistance. Further, the adhesion enhancing layer should be electrically conductive so that charge generated is transmitted to the current collecting substrate. Accordingly, the adhesion enhancing layer comprises a polymeric carrier and an adhesion enhancing agent dispersed in said polymeric carrier.

The polymeric carrier should be adapted to adhere well to the substrate, as well as the electrode material deposited above it. Further, the polymeric carrier should be stable in the presence of the electrolyte used in the system. Preferred polymeric carriers are selected from the group of phenolic formaldehyde, polysiloxanes, fluoropolymers such as poly (1H, 1H-pentadecafluorooctylmethacrylate), epoxies such as nylon epoxy, elastomer epoxy, nitride phenolics, vinyl phenolics, epoxy phenolics, and combinations thereof.

Dispersed throughout the polymeric carrier is the adhesion enhancing agent. In this regard, the adhesion enhancing agent should also aid conductivity, and may thus be, for example carbon, carbon powder, graphite, copper, aluminum, and combinations thereof. The amount of the adhesion enhancing material in the polymeric carrier may vary, and is preferably between about 5 and 25% of the total layer composition. The adhesion enhancing agent acts as an initiator for functional groups in the polymer of the electrode. Thus, the overlying electrode layer may actually penetrate the surface of the adhesion enhancing layer, further strengthening the bond therebetween. Adhesion is also promoted by virtue of the fact that the adhesion enhancing layer is textured, and hence has a very high surface area for bonding with the electrode. This texturing may be accomplished either by mechanically modifying the surface of the layer, or may be an artifact of the deposition process.

Referring now to FIG. 2, there is illustrated therein the substrate of FIG. 1 including the layers of adhesion enhancing material. Disposed atop each layer 16 and 18 is an electrode fabricated of a layer of an electrically conducting polymer 20 and 22. The electrically conducting polymer layers may be fabricated from any of a number of such polymers, examples of which include polyaniline, polypyrrole, polythiophene, other n-doped and p-doped conductive polymers, and combinations thereof. The layer of electrically conducting polymer is typically deposited by electrochemical deposition, to a thickness of between 0.1 and 50 μm, and preferably about 1.0 μm.

Referring now to FIG. 3, there is illustrated therein the electrochemical capacitor device described in FIG. 2 hereof, and further including a layer of an electrolyte material disposed on at least one of the elected. In FIG. 3, electrolyte layer 24 is disposed atop layer 22. The electrolyte layer 24 is preferably a polymer gel or solid electrolyte comprising a polymer matrix and an ion conductive material selected from the group consisting of $H_2SO_4$, $H_3PO_4$, HCl, KOH, NaOH, KCl, NaCl, $NaCO_3$, inorganic salts, organic salts, polymer salts, and combinations thereof. The polymer matrix may be selected from the group of poly (vinyl alcohol), poly (ethylene oxide), poly (acrylamide), poly (urethane), poly (2-vinyl pyridine), poly (isoethianaphthene), and combinations thereof. In one preferred embodiment, the electrolyte is a poly (vinyl alcohol) polymeric carrier with $H_3PO_4$ as the electrolyte.

Figure 4:
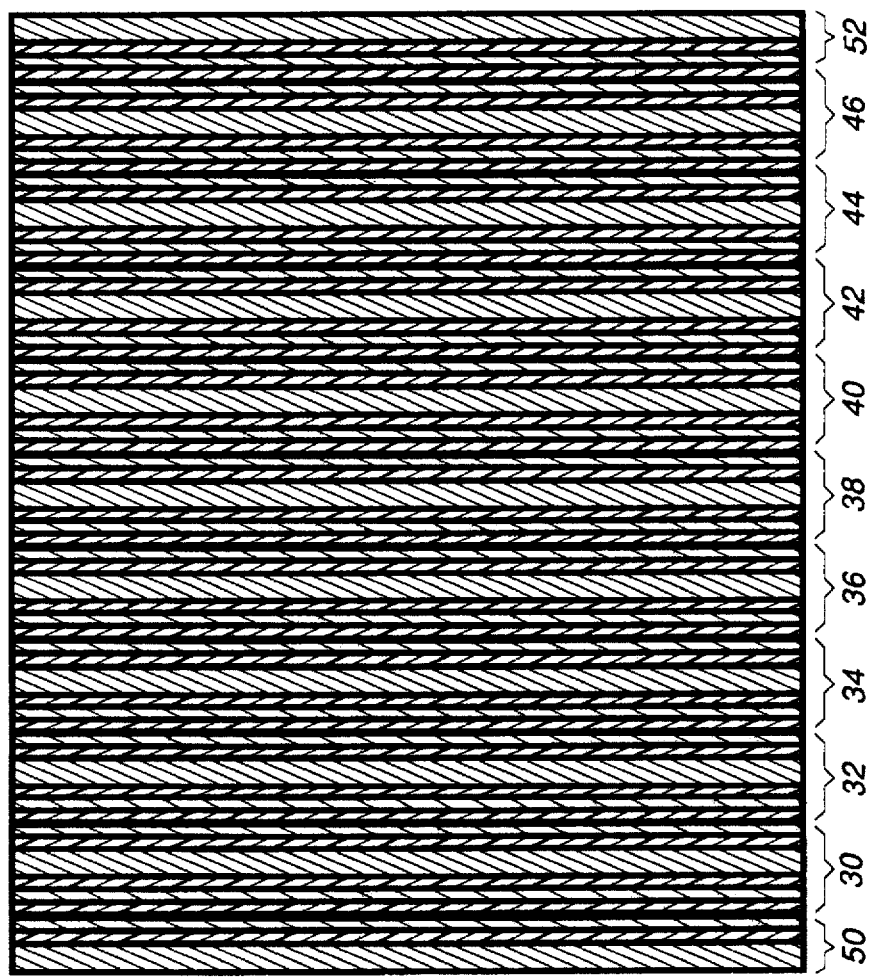
FIG. 4 is a cross-sectional side view of a bipolar device in accordance with the instant invention.

Since in FIGS. 1–3 the electrodes are disposed on both sides of the current carrying substrate, the device so illustrated is a bipolar capacitor device. A high power, high energy bipolar capacitor device can thus be made by stacking a plurality of similar devices one atop another, as is illustrated in FIG. 4. Specifically illustrated in FIG. 4 is a bipolar device including nine (9) bipolar devices 30, 32, 34, 36, 38, 40, 42, 44, 46 arranged in a stacked configuration. Disposed on one end thereof is a first end plate 50 comprising a current collecting substrate, adhesion enhancing layer and electrode layer, all as described hereinabove. The other end of the device is closed by a second end plate 52 comprising a current collecting substrate, electrode layer, and electrolyte layer, all as described above. In this way, the voltage of single devices may be accumulated to provide a high voltage device.

The fabrication and performance of devices according to the instant invention can be better understood from a perusal of the examples which follow.

EXAMPLES

EXAMPLE I

A zinc foil substrate was prepared for coating with the adhesion enhancing material by light sanding and solvent cleaning with 2-propanol. The zinc substrate was then coated with a phenolic resin polymer coating in which approximately 15% of carbon powder was dispersed therethrough.

The material was coated onto the zinc via stencil printing to a thickness of 50 microns, and then cured at 230° C. for 30 minutes. The surface area of the adhesion enhancing coating was increased by subjecting the film to an oxygen plasma for 1.5 minutes in 5 torr at 700 watts. Residue from this process was removed by washing in deionized water.

Figure 5:
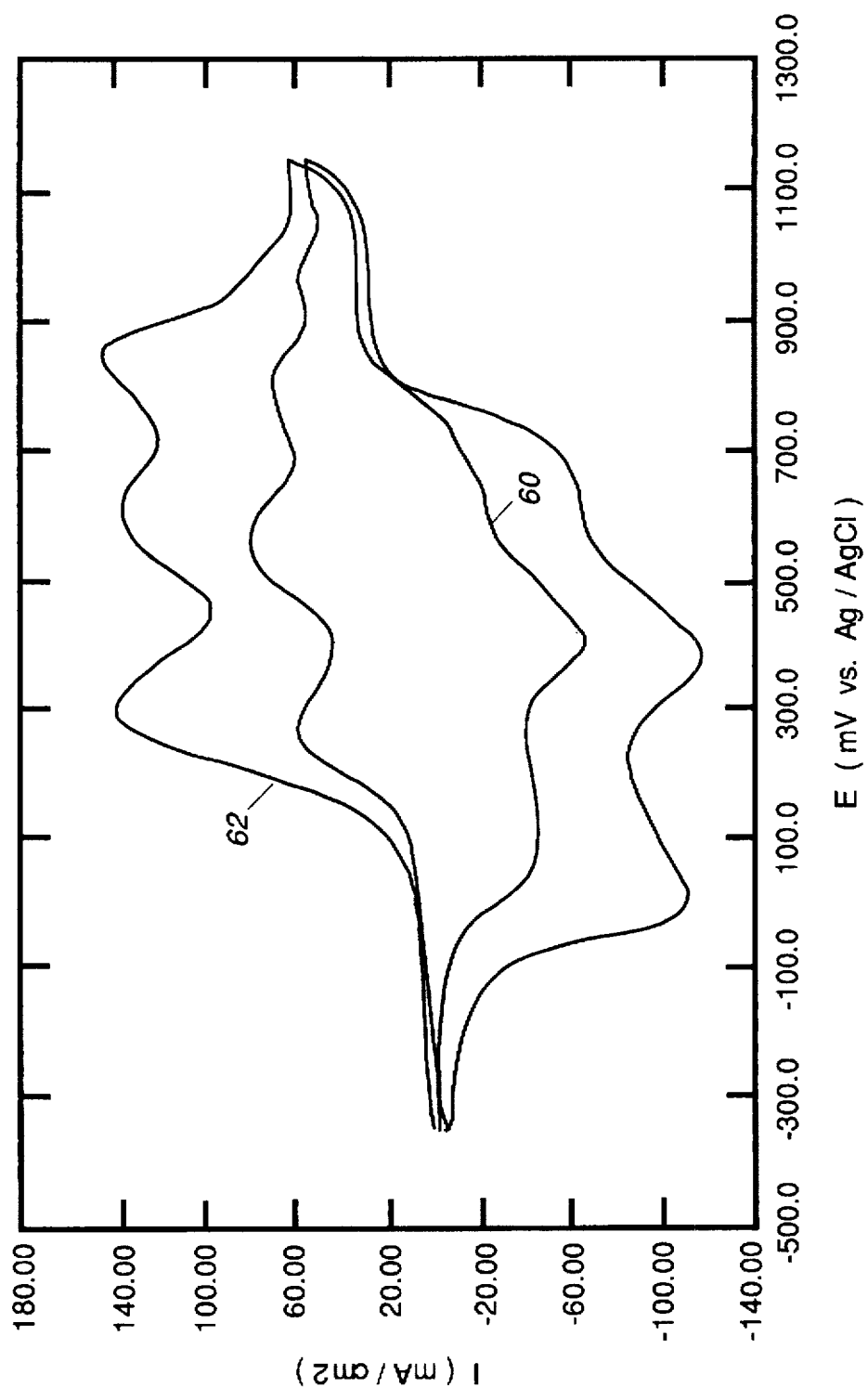
FIG. 5 is a cyclic voltammogram of a first electrochemical capacitor device, in accordance with the invention.

Thereafter, a layer of polyaniline film was grown on the surface of the adhesion enhancing layer, by potential cycling in 0.088 molar (M) aniline+1M $H_2SO_4$. The range of cycling voltage was from −0.35 to 1.05 volts (V). The aniline+$H_2SO_4$ were reagent grade, and purchased from Aldrich. The thickness of the film increased with increasing cycles. Referring now to FIG. 5, there is illustrated therein cyclic voltammogram curves taken at twenty (20) cycles 60, and forty (40) cycles 62. The device fabricated according to this Example I yielded about 1 C/cm$^2$ of charge storage capacity.

EXAMPLE II

A titanium foil substrate was prepared for coating with the adhesion enhancing material by light sanding and solvent cleaning with 2-propanol. The substrate was then coated with a phenolic resin polymer coating in which approximately 15% of carbon powder was dispersed therethrough. The material was coated onto the substrate via stencil printing to a thickness of 50 microns, and then cured at 230° C. for 30 minutes. The surface area of the adhesion enhancing coating was increased by subjecting the film to an oxygen plasma for 1.5 minutes in 5 torr at 700 watts. Residue from this process was removed by washing in deionized water.

Figure 6:
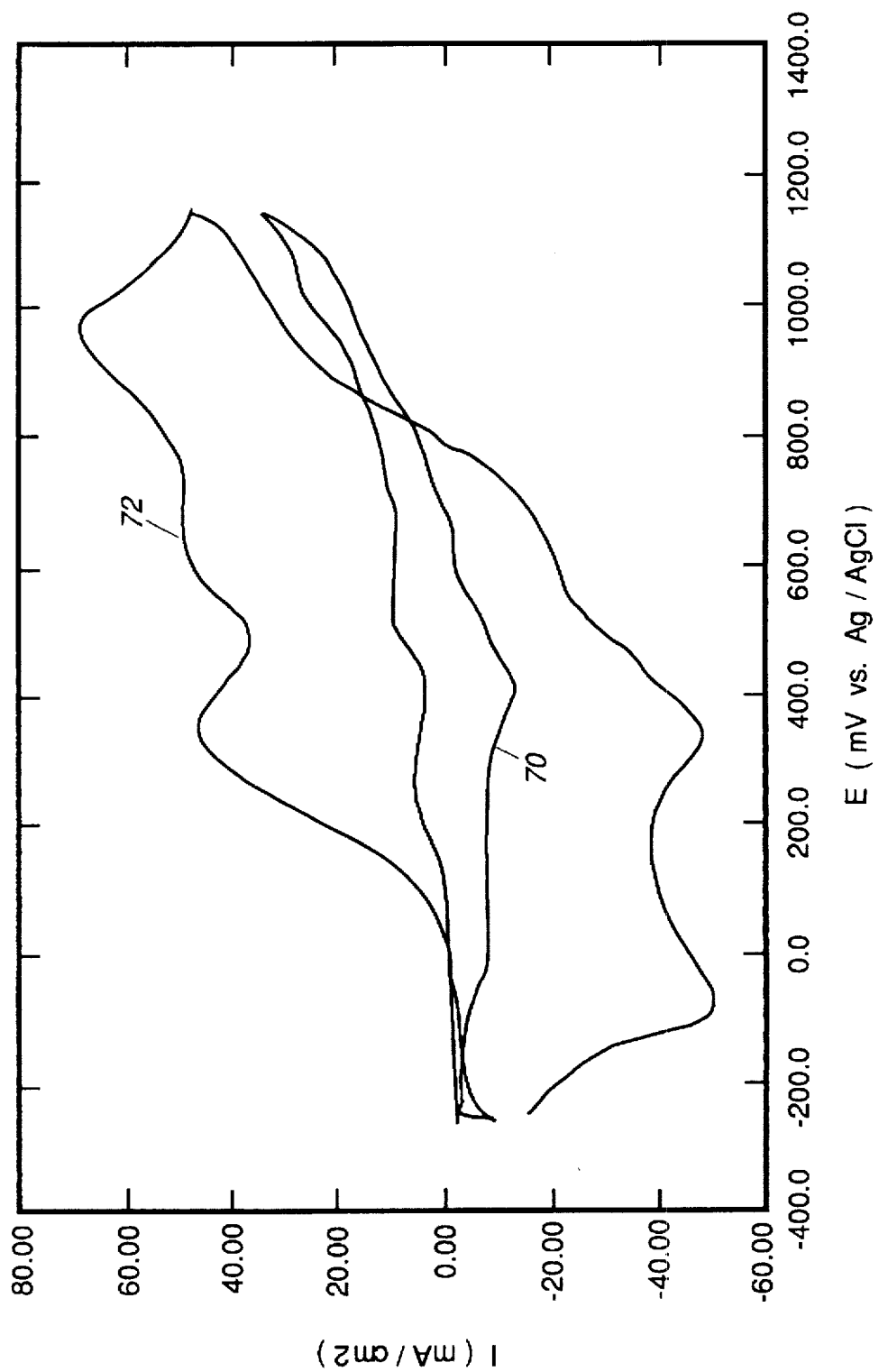
FIG. 6 is a cyclic voltammogram of a second electrochemical capacitor device, in accordance with the invention.

Thereafter, a layer of polyaniline film was grown on the surface of the adhesion enhancing layer, by potential cycling in 0.088 molar (M) aniline+1M $H_2SO_4$. The range of cycling voltage was from −0.35 to 1.05 volts (V). The aniline+$H_2SO_4$ were reagent grade, and purchased from Aldrich. The thickness of the film increased with increasing cycles. Referring now to FIG. 6, there is illustrated therein cyclic voltammogram curves taken at ten (10) cycles 70, and thirty (30) cycles 72. The device fabricated according to this Example yielded about 1.1 C/cm$^2$ of charge storage capacity.

EXAMPLE III

A stainless steel foil substrate was prepared for coating with the adhesion enhancing material by light sanding and solvent cleaning with 2-propanol. The substrate was then coated with a phenolic resin polymer coating in which approximately 15% of carbon powder was dispersed therethrough. The material was coated onto the substrate via stencil printing to a thickness of 50 microns, and then cured at 230° C. for 30 minutes. The surface area of the adhesion enhancing coating was increased by subjecting the film to an oxygen plasma for 1.5 minutes in 5 torr at 700 watts. Residue from this process was removed by washing in deionized water.

Figure 7:
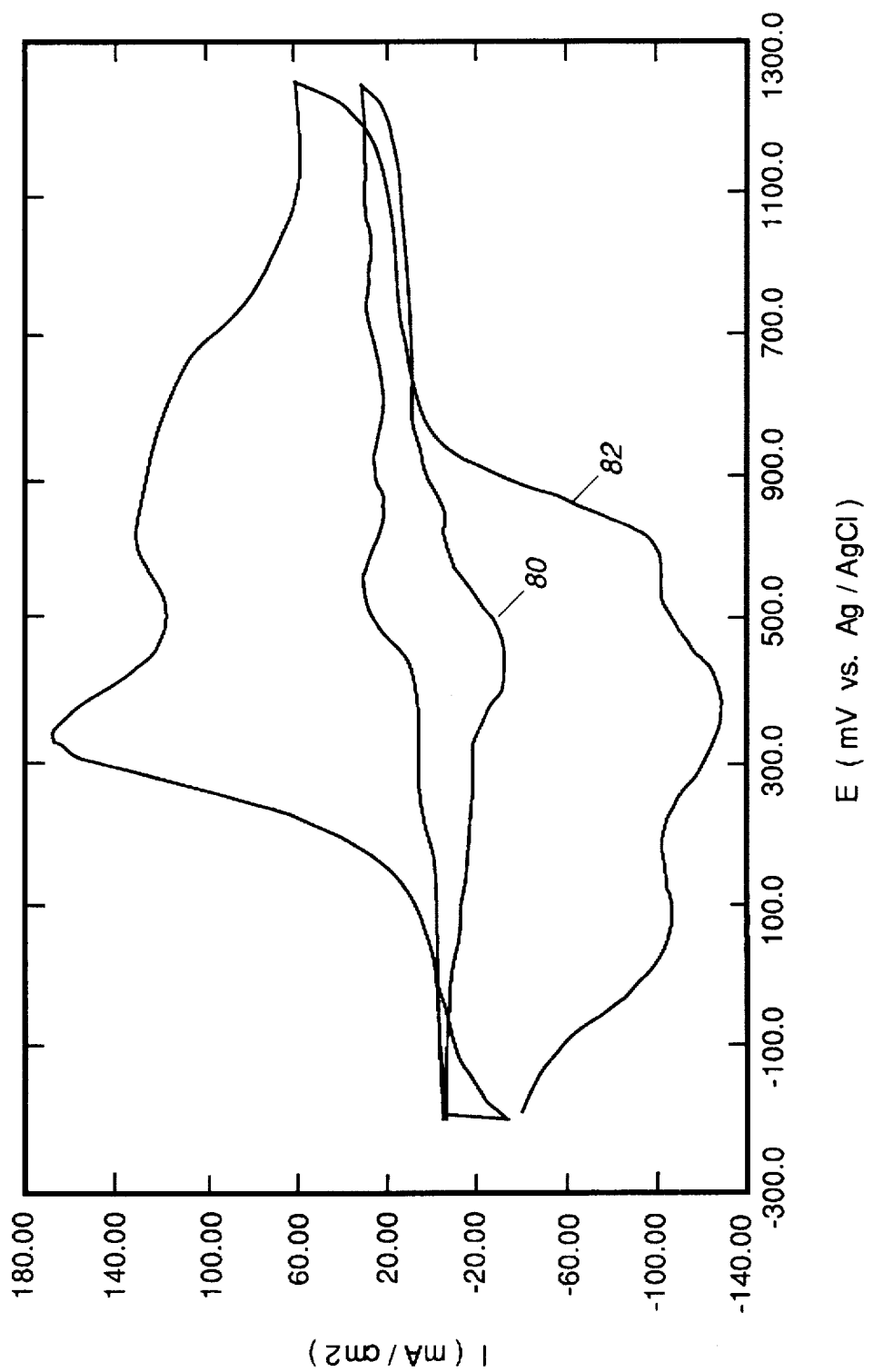
FIG. 7 is a cyclic voltammogram of a third electrochemical capacitor device, in accordance with the invention.

Thereafter, a layer of polyaniline film was grown on the surface of the adhesion enhancing layer, by potential cycling in 0.088 molar (M) aniline+1M $H_2SO_4$. The range of cycling voltage was from −0.35 to 1.05 volts (V). The aniline+$H_2SO_4$ were reagent grade, and purchased from Aldrich. The thickness of the film increased with increasing cycles. Referring now to FIG. 7, there is illustrated therein cyclic voltammogram curves taken at ten (10) cycles 80, and forty (40) cycles 82. The device fabricated according to this Example yielded about 1.1 C/cm$^2$ of charge storage capacity.

EXAMPLE IV

A copper foil substrate was prepared for coating with the adhesion enhancing material by light sanding and solvent cleaning with 2-propanol, which approximately 15% of carbon powder was dispersed therethrough. The material was coated onto the substrate via stencil printing to a thickness of 50 microns, and then cured at 230° C. for 30 minutes. The surface area of the adhesion enhancing coating was increased by subjecting the film to an oxygen plasma for 1.5 minutes in 5 torr at 700 watts. Residue from this process was removed by washing in deionized water.

Figure 8:
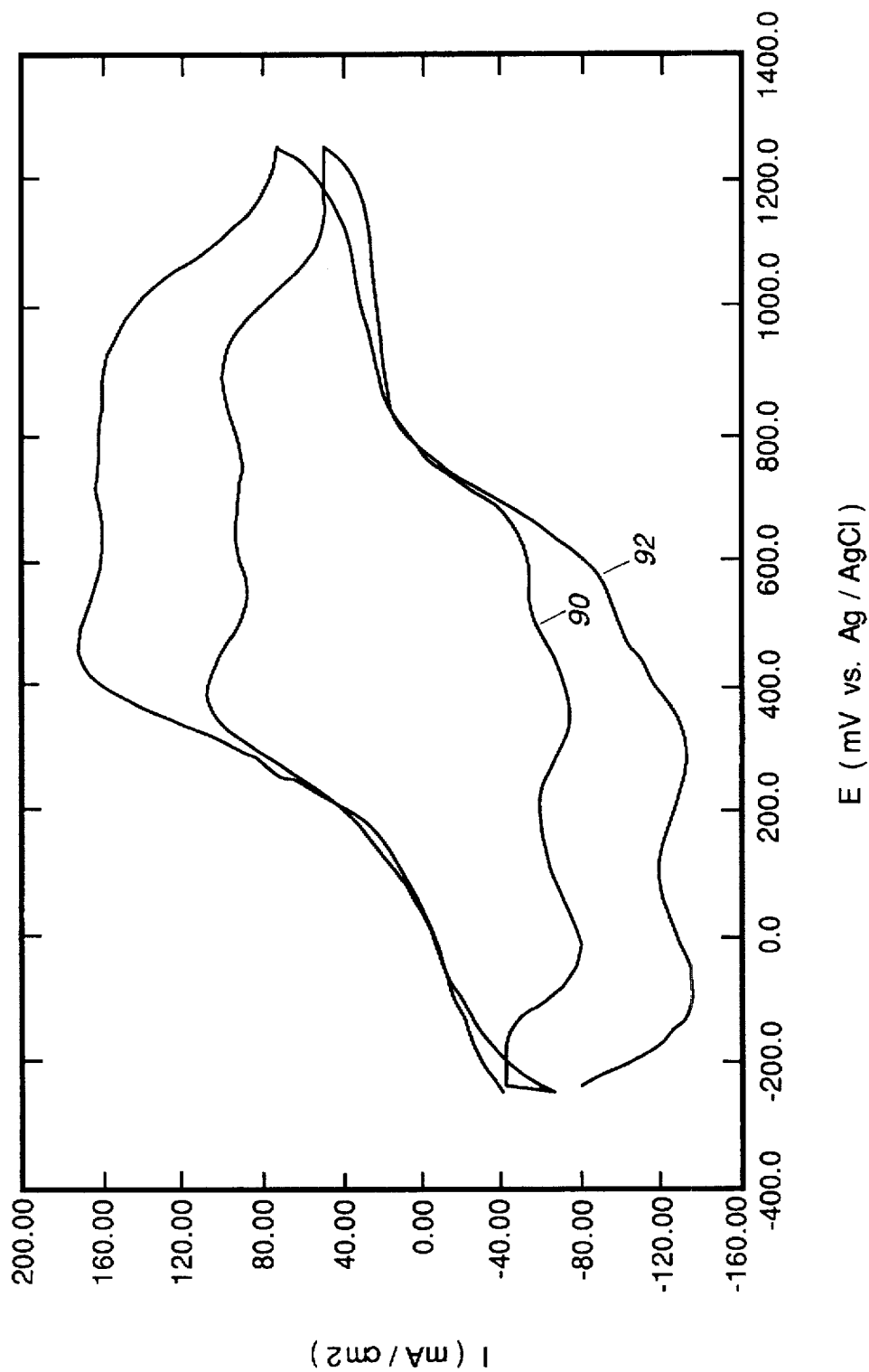
FIG. 8 is a cyclic voltammogram of a fourth electrochemical capacitor device, in accordance with the invention.

Thereafter, a layer of polyaniline film was grown on the surface of the adhesion enhancing layer, by potential cycling in 0.088 molar (M) aniline+1M $H_2SO_4$. The range of cycling voltage was from −0.35 to 1.05 volts (V). The aniline+ $H_2SO_4$ were reagent grade, and purchased from Aldrich. The thickness of the film increased with increasing cycles. Referring now to FIG. 8, there is illustrated therein cyclic voltammogram curves taken at twenty (20) cycles 90, and forty (40) cycles 92. The device fabricated according to this Example yielded about 1.04 $C/cm^2$ of charge storage capacity.

EXAMPLE V

Figure 9:
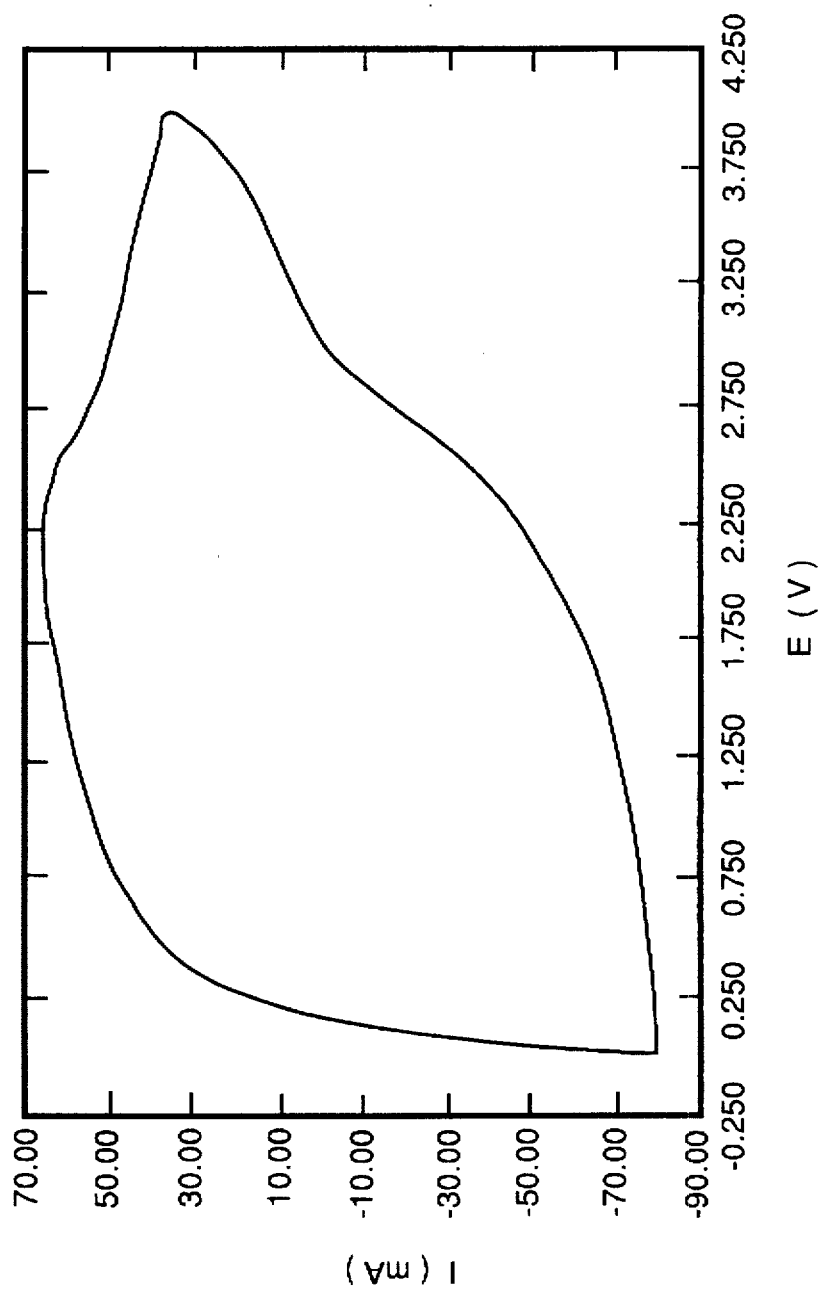
FIG. 9 is a cyclic voltammogram of a first electrochemical capacitor device, in accordance with the invention.

A plurality of devices such as those described hereinabove in Example III were arranged in a stacked configuration as illustrated in FIG. 4 to create a bipolar capacitor device. The electrolyte layer used in the device was polymer gel of poly(vinyl alcohol) and $H_3PO_4$. The electrolyte was applied to the surface of the electrode and air dried to form a uniformly thin layer. In this way, a seven (7) cell device was built, which provided about a 4 V potential window. Referring now to FIG. 9, there is illustrated therein a CV curve for the device at a scan rate of 2 V/s. The curve was not distorted, demonstrating that device possessed high power density.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical capacitor comprising:
   a current collecting substrate fabricated of a non-noble metal, and having at least a first and second surface;
   a layer of an adhesion enhancing material disposed on at least one surface of said substrate, said adhesion enhancing material comprising a polymeric carrier and an adhesion enhancing agent dispersed in said polymeric carrier;
   a layer of an electrically conducting polymer disposed on said adhesion enhancing material; and
   a layer of a polymer gel or solid electrolyte disposed atop said electrically conducting polymer.

2. An electrochemical capacitor as in claim 1, wherein said current collecting substrate is fabricated of a metal selected from the group of materials consisting of zinc, titanium, stainless steel, copper, nickel, iron, lead, tin, indium, tungsten, aluminum, bismuth, molybdenum, niobium, magnesium, manganese, alloys of the same, and combinations thereof.

3. An electrochemical capacitor as in claim 1, wherein said adhesion enhancing material is selected from the group of materials consisting of carbon, carbon powder, graphite, copper, aluminum, and combinations thereof.

4. An electrochemical capacitor as in claim 1, wherein said polymeric carrier is selected from the group of materials consisting of phenolic formaldehyde, polysiloxanes, fluoropolymers, epoxies, and combinations thereof.

5. An electrochemical capacitor as in claim 1, wherein said layer of adhesion enhancing material has a high surface area.

6. An electrochemical capacitor as in claim 1, wherein said electrically conducting polymer is selected from the group of materials consisting of polyaniline, polypyrrole, polythiophene, and combinations thereof.

7. An electrochemical capacitor as in claim 1, wherein said polymer gel or solid electrolyte is an electrolyte fabricated of a polymer matrix and an ion conductor material selected from the group consisting of $H_2SO_4$, $H_3PO_4$, HCl, KOH, NaOH, KCl, NaCl, $NaCO_3$, inorganic salts, organic salts, polymer salts, and combinations thereof.

8. An electrochemical capacitor as in claim 7, wherein said polymer matrix is selected from the group consisting of poly (vinyl alcohol), poly (ethylene oxide), poly (acrylamide), poly (urethane), poly (2-vinyl pyridine), poly (isoethianaphthene), and combinations thereof.

9. An electrochemical capacitor as in claim 1, wherein a layer of an adhesion enhancing material, and a layer of an electrically conducting polymer are disposed both surfaces of said substrate.

10. A high power bipolar capacitor device, said capacitor device comprising at least two capacitor subassemblies, each said capacitor subassembly comprising:
    a current collecting, bipolar substrate fabricated of a non-noble metal, and having at least a first and second surface;
    a layer of an adhesion enhancing material disposed on each surface of said substrate, said adhesion enhancing material comprising a polymeric carrier and an adhesion enhancing agent dispersed in said polymeric carrier;
    a layer of an electrically conducting polymer disposed on each said layer of adhesion enhancing material, said layer of conducting polymer being selected from the group of materials consisting of polyaniline, polypyrrole, polythiophene, and combinations thereof; and
    a layer of a polymer gel or solid electrolyte disposed atop at least one of said layers of electrically conducting polymer.

11. A bipolar capacitor as in claim 10, wherein said current collecting substrate is fabricated of a metal selected from the group of materials consisting of zinc, titanium, stainless steel, copper, nickel, iron, lead, tin, indium, tungsten, aluminum, bismuth, molybdenum, niobium, magnesium, manganese, alloys of the same, and combinations thereof.

12. A bipolar capacitor as in claim 10, wherein said adhesion enhancing material is selected from the group of materials consisting of carbon, carbon powder, graphite, copper, aluminum, and combinations thereof.

13. A bipolar capacitor as in claim 12, wherein said polymeric carrier is selected from the group of materials consisting of phenolic formaldehyde, polysiloxanes, fluoropolymers, epoxies, and combinations thereof.

14. A bipolar capacitor as in claim 10, wherein said layer of adhesion enhancing material has a high surface area.

15. A bipolar capacitor as in claim 10, wherein said polymer gel or solid electrolyte is an electrolyte fabricated of a polymer matrix and an ion conductor material selected from the group consisting of $H_2SO_4$, $H_3PO_4$, HCl, KOH, NaOH, KCl, NaCl, $NaCO_3$, inorganic salts, organic salts, polymer salts, and combinations thereof.

16. A bipolar capacitor as in claim 15, wherein said polymer matrix is selected from the group consisting of poly (vinyl alcohol), poly (ethylene oxide), poly (acrylamide), poly (urethane), poly (2-vinyl pyridine), poly (isoethianaphthene), and combinations thereof.

17. A method of fabricating a high power electrochemical capacitor device, said method comprising the steps of:

providing a current collecting, bipolar substrate fabricated of a non-noble metal, and having at least a first and second surface;

depositing a layer of a high surface area adhesion enhancing material on each surface of said substrate, said adhesion enhancing material comprising a polymeric carrier and an adhesion enhancing agent dispersed in said polymeric carrier;

depositing a layer of an electrically conducting polymer on each said layer of adhesion enhancing material, said layer of conducting polymer being selected from the group of materials consisting of polyaniline, polypyrrole, polythiophene, and combinations thereof; and disposing a layer of a polymer gel or solid electrolyte atop at least one of said layers of electrically conducting polymer.

18. A method as in claim 17, wherein said current collecting substrate is fabricated of a metal selected from the group of materials consisting of zinc, titanium, stainless steel, copper, nickel, iron, lead, tin, indium, tungsten, aluminum, bismuth, molybdenum, niobium, magnesium, manganese, alloys of the same, and combinations thereof.

19. A method as in claim 17, wherein said adhesion enhancing material is selected from the group of materials consisting of carbon, carbon powder, graphite, copper, aluminum, and combinations thereof.

20. A method as in claim 17, wherein said polymeric carrier is selected from the group of materials consisting of phenolic formaldehyde, polysiloxanes, fluoropolymers, epoxies, and combinations thereof.

21. A method as in claim 17, wherein said electrically conducting polymer is selected from the group of materials consisting of polyaniline, polypyrrole, polythiophene, and combinations thereof.

22. A method as in claim 17, wherein said polymer gel or solid electrolyte is an electrolyte fabricated of a polymer matrix and an ion conductor selected from the group consisting of $H_2SO_4$, $H_3PO_4$, HCl, KOH, NaOH, KCl, NaCl, $NaCO_3$, inorganic salts, organic salts, polymer salts, and combinations thereof.

23. A method as in claim 22, wherein said polymer matrix is selected from the group consisting of poly (vinyl alcohol), poly (ethylene oxide), poly (acrylamide), poly (urethane), poly (2-vinyl pyridine), poly (isoethianaphthene), and combinations thereof.

* * * * *